United States Patent
Fowler et al.

(10) Patent No.: US 10,344,969 B2
(45) Date of Patent: Jul. 9, 2019

(54) BURNER ASSEMBLY

(71) Applicant: Electrolux Home Products, Inc., Charlotte, NC (US)

(72) Inventors: Warren Fowler, Springfield, TN (US); George Lewis, Gallatin, TN (US); Brian Martin, Springfield, TN (US)

(73) Assignee: Electrolux Home Products, Inc., Charlotte, NC (US)

( * ) Notice: Subject to any disclaimer, the term of this patent is extended or adjusted under 35 U.S.C. 154(b) by 149 days.

(21) Appl. No.: 15/667,826

(22) Filed: Aug. 3, 2017

(65) Prior Publication Data
US 2019/0041055 A1 Feb. 7, 2019

(51) Int. Cl.
| | |
|---|---|
| F24C 3/08 | (2006.01) |
| F23D 14/06 | (2006.01) |
| F23D 14/70 | (2006.01) |
| F23K 5/00 | (2006.01) |
| F24C 15/10 | (2006.01) |
| F02C 7/22 | (2006.01) |

(52) U.S. Cl.
CPC ............ *F23D 14/06* (2013.01); *F23D 14/70* (2013.01); *F23K 5/005* (2013.01); *F24C 15/108* (2013.01); *F02C 7/222* (2013.01); *F23D 2900/14062* (2013.01)

(58) Field of Classification Search
CPC .......... F23D 14/06; F23D 14/70; F23D 14/84; F23D 2203/1026; F23D 2900/14062; F23D 2900/00003; F23D 2900/14063; F23K 5/005; F24C 15/108; F24C 3/085; F02C 7/222

See application file for complete search history.

(56) References Cited

U.S. PATENT DOCUMENTS

| | | | |
|---|---|---|---|
| 2,733,758 | A | 2/1956 | Lundgren |
| 2,854,069 | A | 9/1958 | Jensen |
| 3,796,535 | A | 3/1974 | De Gouville |
| 4,086,052 | A | 4/1978 | Laux et al. |

(Continued)

FOREIGN PATENT DOCUMENTS

| | | |
|---|---|---|
| CA | 2558136 | 10/2005 |
| JP | 07217879 | 8/1995 |

(Continued)

OTHER PUBLICATIONS

International Search Report and Written Opinion for PCT/US2018/044957 dated Oct. 29, 2018, 12 pages.

*Primary Examiner* — Alfred Basichas
(74) *Attorney, Agent, or Firm* — Pearne & Gordon LLP

(57) ABSTRACT

A burner body includes a wall that defines a combustible-gas chamber. The burner body further includes gas-flow inlet communicating with the combustible-gas chamber and a plurality of burner ports that permit combustible gas to flow from the chamber to an exterior of the burner body. The burner body further includes one or more flow restrictions configured to restrict flow through a proportion of the burner ports. When combustible gas is supplied at a first flow rate, each flow restriction is configured to restrict flow through an associated burner port at a first restriction ratio. When combustible gas is supplied at a second flow rate that is smaller than the first flow rate, each flow restriction is configured to restrict flow through its associated burner port at a second restriction ratio that is less than the first restriction ratio.

20 Claims, 5 Drawing Sheets

(56) References Cited

U.S. PATENT DOCUMENTS

| | | |
|---|---|---|
| 5,133,657 A | 7/1992 | Harris |
| 5,133,658 A | 7/1992 | Le Monnier De Gouville et al. |
| 5,649,822 A | 7/1997 | Gertler et al. |
| 5,800,159 A | 9/1998 | Maughan et al. |
| 6,263,868 B1 | 7/2001 | Koch et al. |
| 6,322,354 B1 | 11/2001 | Carbone et al. |
| 7,017,572 B2 | 3/2006 | Cadima |
| 7,614,877 B2 | 11/2009 | McCrorey et al. |
| 8,845,326 B2 | 9/2014 | Shaffer et al. |
| 8,863,735 B2 | 10/2014 | Cadima |
| 9,255,710 B2 | 2/2016 | Cadima |
| 2009/0162801 A1 | 6/2009 | McCrorey et al. |
| 2015/0219340 A1 | 8/2015 | Cadima |
| 2016/0076767 A1 | 3/2016 | Super et al. |

FOREIGN PATENT DOCUMENTS

| | | |
|---|---|---|
| JP | 2008202866 | 9/2008 |
| WO | 2015078605 | 6/2015 |

BURNER ASSEMBLY

FIELD

The present invention relates generally to a burner assembly having a plurality of burner ports. More particularly, it relates to a burner assembly having one or more flow restrictions configured to restrict flow through a proportion of the burner ports.

BACKGROUND

A burner assembly can include a burner body having an annular outer wall and a plurality of burner ports circumferentially spaced about the outer wall, which permit combustible gas to flow from within the burner body to the outside. The combustible gas exiting the burner ports can be ignited to produce a ring of discrete flames at the exterior surface of the burner body. However, in some instances combustion of the gas can be disturbed due to, for example, a sudden draft of air that arises in the surrounding ambient environment or is generated by the opening and closing of a door or drawer on the appliance. Combustion can be particularly susceptible to disturbance when gas is being delivered at relatively low rates of flow through the burner ports. In some cases, disturbance of combustion at the burner ports can lead to extinguishment of the flame at one or more burner ports.

SUMMARY

In accordance with a first aspect, a burner body includes a wall that defines a combustible-gas chamber. The burner body further includes a gas-flow inlet communicating with the combustible-gas chamber and a plurality of burner ports that permit combustible gas to flow from the chamber to an exterior of the burner body. The burner body further includes one or more flow restrictions configured to restrict flow through a proportion of the burner ports. When combustible gas is supplied at a first flow rate, each flow restriction is configured to restrict flow through an associated burner port at a first restriction ratio. When combustible gas is supplied at a second flow rate that is smaller than the first flow rate, each flow restriction is configured to restrict flow through its associated burner port at a second restriction ratio that is less than the first restriction ratio.

In accordance with a second aspect, a burner assembly includes a burner body having a wall that defines a combustible gas chamber. The burner body further includes a gas-flow inlet communicating with the combustible-gas chamber and a plurality of burner ports in the wall that permit combustible gas to flow from the combustible-gas chamber through the plurality of burner ports to an exterior of the burner body. The burner body further includes one or more flow restrictions configured to restrict flow through a proportion of the plurality of burner ports based on a rate of combustible gas being supplied to the burner body. The burner assembly further includes a burner cap placed on the burner body that delimits a top of the combustible-gas chamber. When combustible gas is supplied to the burner body through the opening at a first flow rate, each flow restriction is configured to restrict flow through an associated burner port at a first restriction ratio. When combustible gas is supplied to the burner body through the opening at a second flow rate that is smaller than the first flow rate, each flow restriction is configured to restrict flow through its associated burner port at a second restriction ratio that is less than the first restriction ratio.

BRIEF DESCRIPTION OF THE DRAWINGS

The foregoing and other aspects will become apparent to those skilled in the art to which the present examples relate upon reading the following description with reference to the accompanying drawings, in which.

DETAILED DESCRIPTION

Figure 1:
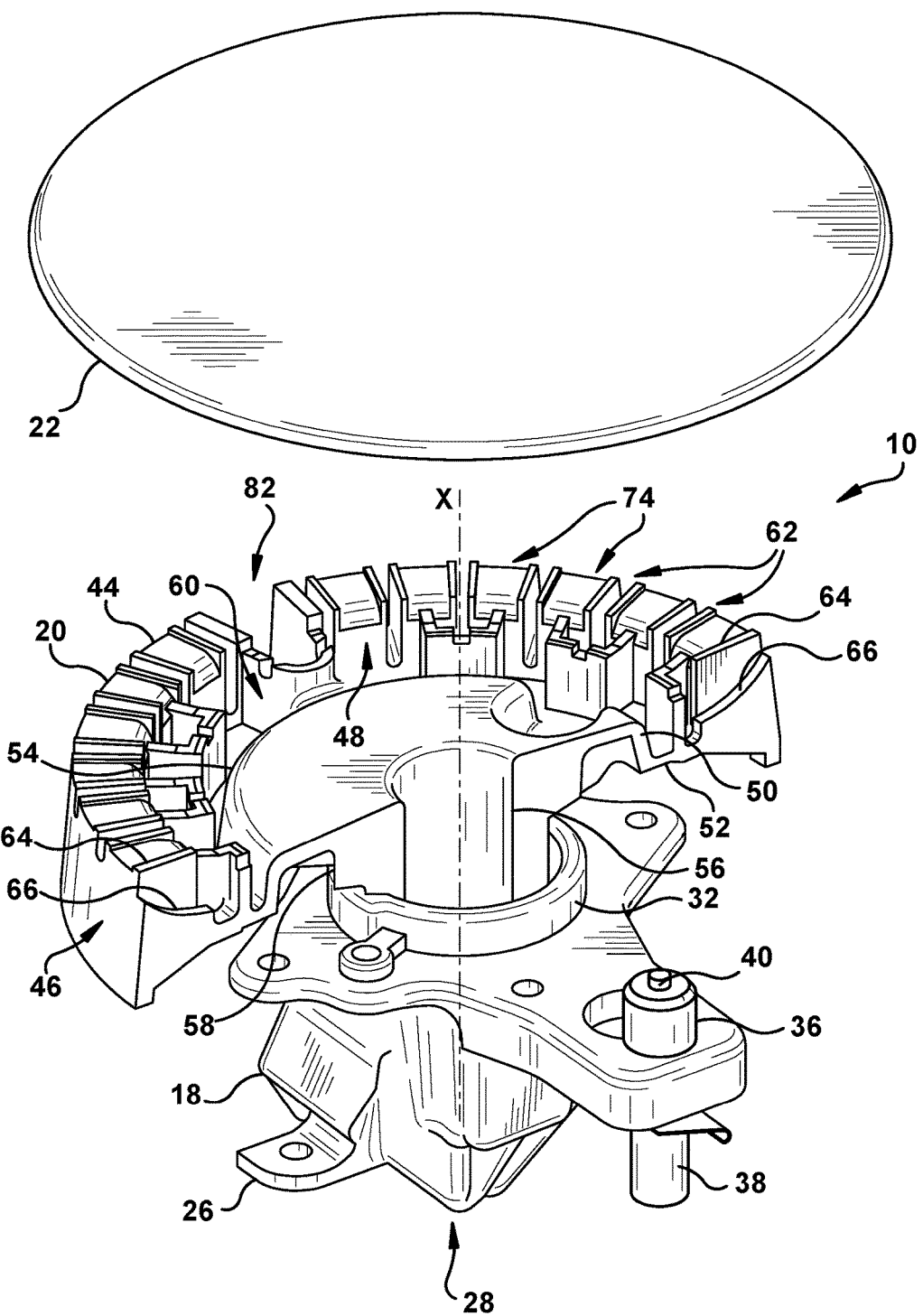
FIG. 1 is an exploded perspective view, partially in cross-section, of an example burner assembly.

Referring to FIG. 1, an example burner assembly 10 is shown for mounting to a cooktop surface of a cooking appliance. The burner assembly 10 includes an orifice holder 18, a burner body 20, and a burner cap 22.

The orifice holder 18 includes a base 26 that defines a gas inlet 28 and is configured for attachment to a fuel supply (not shown) to supply fuel into the gas inlet 28. An orifice fitting (not shown) can be secured to the orifice holder 18 such that the orifice fitting is in fluid communication with the gas inlet 28. The orifice holder 18 further includes a cylindrical member 32 for mating with an annular boss (described further below) on an underside of the burner body 20. The cylindrical member 32 is configured to receive a gas supply jet from the orifice fitting and deliver the gas supply to the burner body 20. In particular, the cylindrical member 32 can be located directly above and spaced from the orifice fitting such that the cylindrical member 32 is coaxial with the orifice fitting, though other configurations are possible in other embodiments.

The orifice holder 18 further includes an aperture 36 for receiving a spark ignition assembly 38. The spark ignition assembly 38 includes a spark electrode or wire 40 formed of electrically conductive material for connection to a source of high voltage potential. The spark ignition assembly 38 can be mounted to the orifice holder 18 such that a lower portion of the spark ignition assembly 38 extends below the cooktop surface while an upper portion of the spark ignition assembly 38 extends through an aperture in the cooktop surface and is received within an ignition chamber formed in the burner body 20.

The burner body 20 includes an outer wall 44 that extends about a perimeter of the burner body 20. The outer wall 44 has an exterior surface 46 and an interior surface 48 that extends about a central axis X of the burner assembly 10. The exterior surface 46 has the general shape of a truncated cone and the interior surface 48 is generally cylindrical in configuration, though other shapes are possible in other embodiments. The burner body 20 further includes an inner wall 50 that is spaced radially inward from the outer wall 44 and is surrounded by the outer wall 44. The inner wall 50 is coaxial with the outer wall 44 and is connected to the outer wall 44 by an annular bottom wall 52. Moreover, the inner wall 50 forms part of an annular projection 54 that extends upward from the bottom wall 52 and defines an opening 56 located substantially centrally in the inner wall 50.

The burner body 20 further includes an annular boss 58 that extends downward from an underside of the annular projection 54 and is coaxial with the inner wall 50. The opening 56 extends through the annular boss 58 such that combustible gas may enter the opening 56 at the bottom of the annular boss 58 and flow through the opening 56 into the interior of the burner body 20. In particular, the annular boss 58 can be received within the cylindrical member 32 of the orifice holder 18, which can deliver a gas supply to the opening 56.

The outer wall 44, inner wall 50, and bottom wall 52 of the burner body 20 define a combustible-gas chamber 60 therebetween that is surrounded by the outer wall 44. The combustible-gas chamber 60 is substantially annular in shape and acts to hold combustible gas that enters the burner body 20 through the opening 56 for subsequent distribution to burner ports, as described below. The bottom wall 52 closes off the bottom of the chamber 60 and the top of that chamber can be closed off by the burner cap 22, as further described below.

The burner body 20 includes a plurality of burner ports 62 defined by the outer wall 44, which permit combustible gas to pass therethrough from the combustible-gas chamber 60 to an exterior of the burner body 20. The burner ports 62 are circumferentially spaced about the perimeter of the outer wall 44 and extend from the interior surface 48 to the exterior surface 46 of the outer wall 44 to provide a path for combustible gas to pass therethrough. Each burner port 62 is defined by a pair of circumferentially spaced side walls 64 and a floor 66 that are formed by the outer wall 44. The floor 66 is curved such that the floor 66 curves upward from the interior surface 48 to the exterior surface 46 of the outer wall 44, though other curvatures may be possible. In some embodiments, the floor 66 may be flat.

Figure 2:
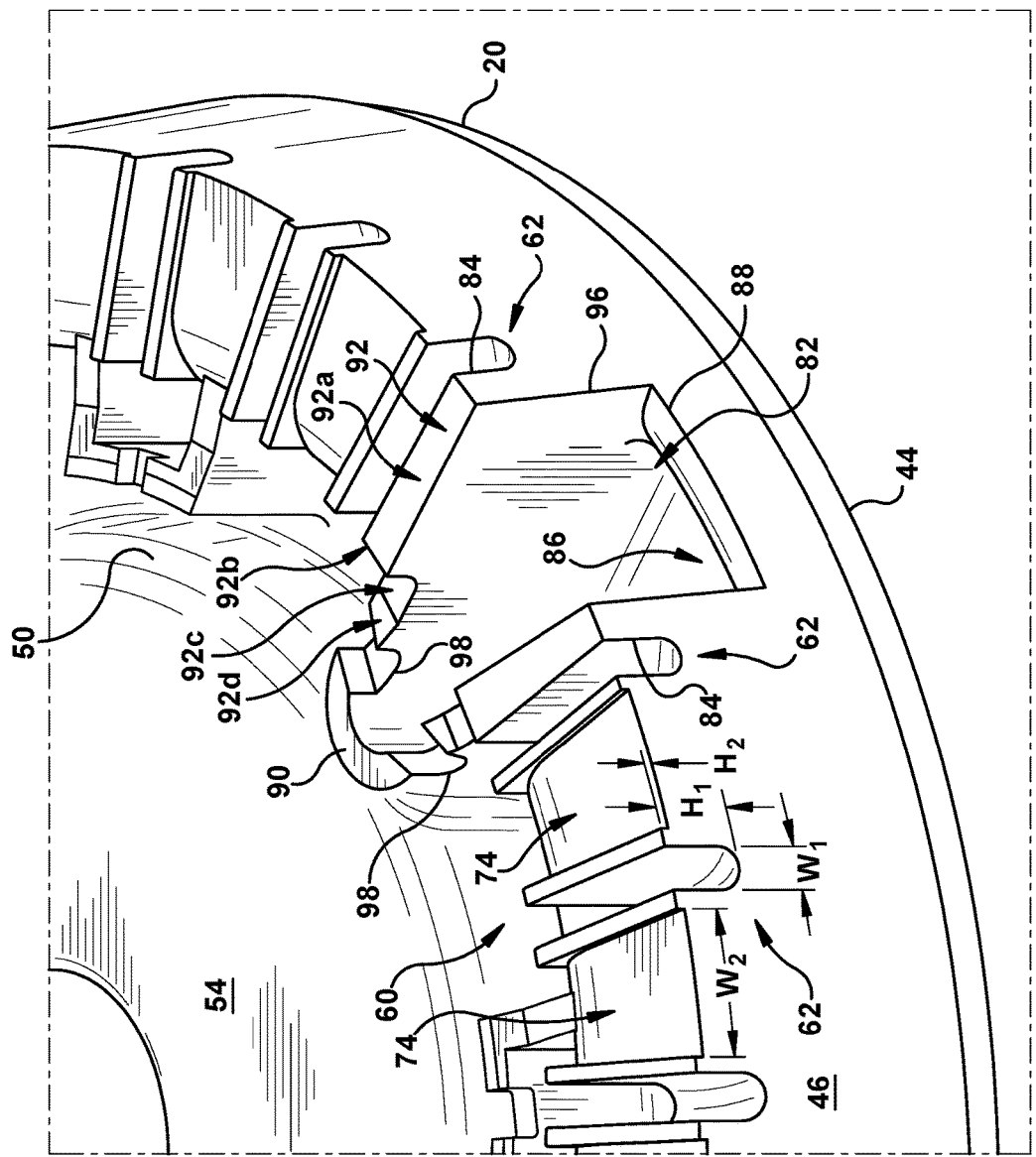
FIG. 2 is a close-up perspective view of a burner body of the burner assembly.

As shown in FIG. 2, each burner port 62 has a height $H_1$, width $W_1$, and area at the exterior surface 46 of the outer wall 44 (the height $H_1$ being measured along the central axis X, the width $W_1$ being the distance between its side walls 64, and the area being the product of the height $H_1$ and width $W_1$). The height $H_1$ for each burner port 62 is typically significantly larger than its width $W_1$. Preferably for each burner port 62, the height $H_1$ is greater than or equal to about 0.10 inches and less than or equal to about 0.25 inches, the width $W_1$ is greater than or equal to about 0.05 inches and less than or equal to about 0.1 inches, and the area is greater than or equal to about 0.008 square inches and less than or equal to about 0.02 square inches. However, the height $H_1$, width $W_1$, and/or area for each burner port 62 can be any value outside of these ranges without departing from the scope of the invention.

Figure 3:
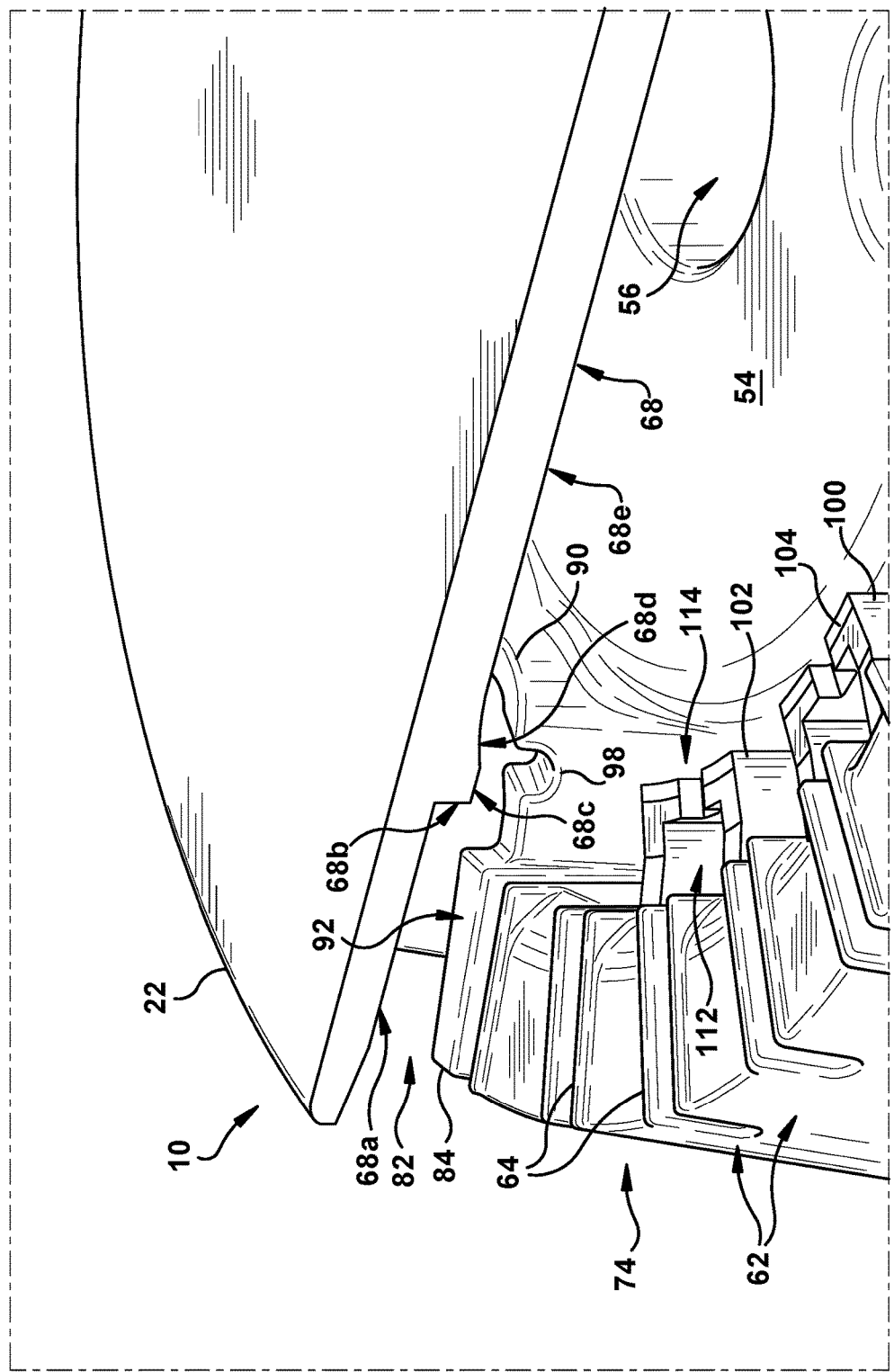
FIG. 3 is a close-up perspective view of the burner assembly wherein a burner cap of the burner assembly is illustrated in partial cross-section.

The burner cap 22 is designed to cover and delimit the top of each burner port 62. More specifically, as shown in FIG. 3, the burner cap 22 has an undersurface 68 that is configured to complementarily engage and rest upon the side walls 64 of the burner ports 62 so as to inhibit the passage of combustible gas between the side walls 64 and the burner cap 22. In the present embodiment, the undersurface 68 includes a plurality of substantially annular surface portions distributed radially beginning with a first surface portion 68a adjacent the perimeter of the cap 22, and ending with a fifth surface portion located at the center of the cap 22. The first surface portion 68a is horizontal; a second surface portion 68b is vertical and extends downward from a radially inward end of the first surface portion 68a; a third surface portion 68c is horizontal and extends radially inward from the second surface portion 68b; a fourth surface portion 68d is angled and extends radially inward from the third surface portion 68c in an upward direction; and the fifth surface portion 68e is horizontal and extends radially inward from the fourth surface portion 68d. The surface portions 68a-d of the undersurface 68 are all annular, while surface portion 68e in the illustrated embodiment is circular; all of them extend completely about the central axis X of the burner assembly 10. It is to be appreciated that the undersurface 68 may include other configurations and in some examples, may simply comprise a flat, horizontal surface.

When the burner cap 22 is in place on the burner body 20, the first surface portion 68a of the undersurface 68 will rest on the side walls 64 of the burner ports 62 and the second surface portion 68b of the undersurface 68 will face and be located adjacent to the inner ends of the side walls 64, thereby preventing lateral movement of the burner cap 22 with respect to the burner body 20. Moreover, since the first and second surface portions 68a, 68b of the undersurface 68 are both annular, the burner cap 22 can be appropriately placed onto the burner body 20 without the necessity of aligning any particular portion of the circumference of the burner cap 22 with the burner ports 62.

As combustible gas exits the burner ports 62, the combustible gas can be ignited to produce a ring of discrete flames at the exterior surface 46 of the burner body 20. However, in some instances, combustion of the gas can be disturbed due to, for example, a sudden draft of air that arises in the surrounding ambient environment or is generated by the opening and closing of a door or drawer on the appliance. Combustion can be particularly susceptible to disturbance when gas is being delivered at relatively low rates of flow through the burner ports 62. For instance, in embodiments having a large number of burner ports 62 (e.g., 20 or more burner ports), the flow of combustible gas delivered to the burner body 20 is divided among the large number of burner ports 62, thereby significantly reducing the rate of flow passing through each burner port 62 and increasing the likelihood of disturbance (as compared to burner bodies with fewer burner ports for the same overall gas flowrate). In some cases, disturbance of combustion at the burner ports 62 can lead to extinguishment of the flame at one or more burner ports 62. Thus, as described below the burner body 20 can have one or more features to help maintain or reestablish combustion at the burner ports 62, particularly at low rates of flow.

Figure 4:
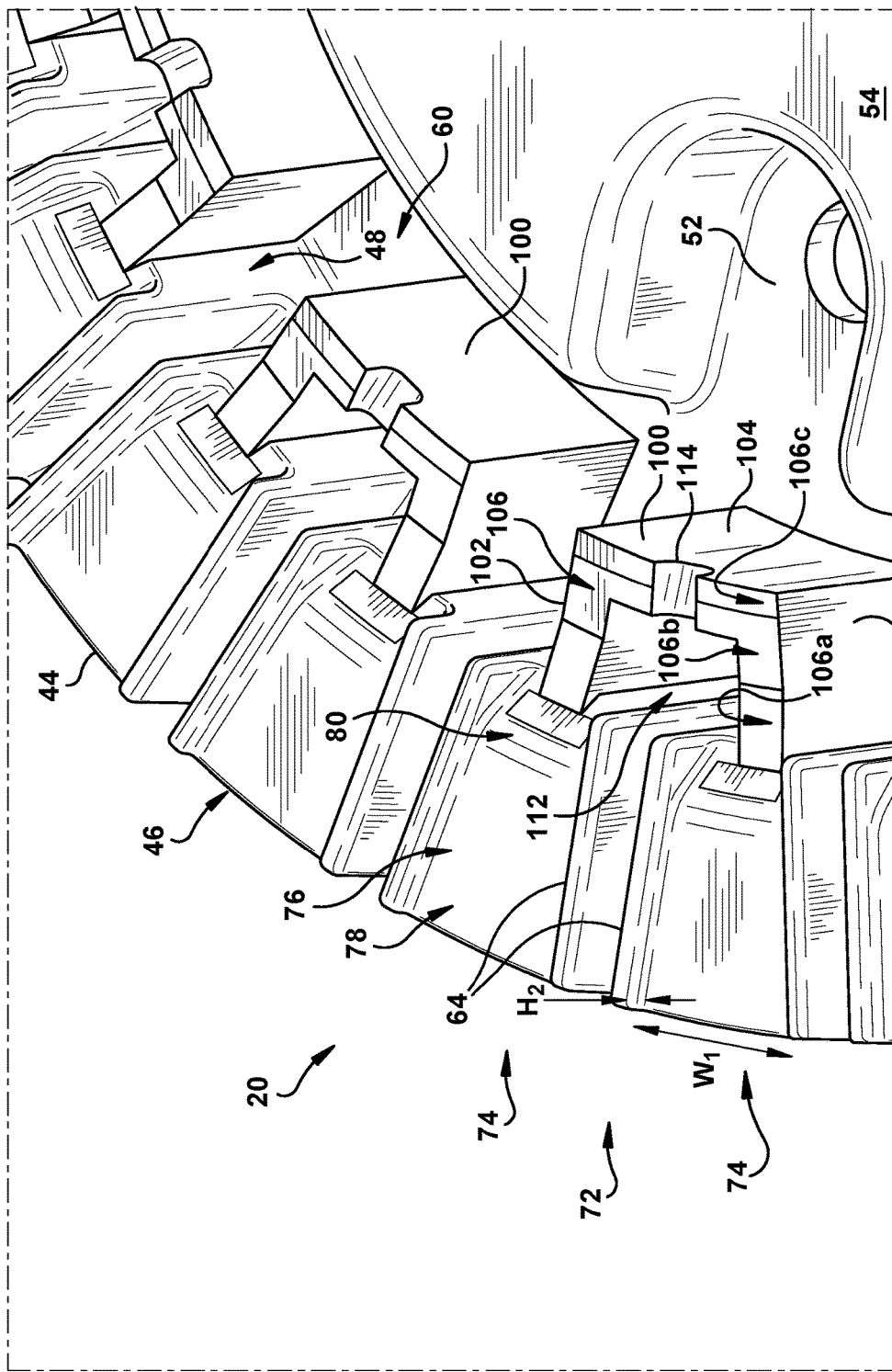
FIG. 4 is another close-up perspective view of the burner body.

For instance, as best seen in FIG. 4, the burner body 20 can include a plurality of crossover ports 74 defined by the outer wall 44. The crossover ports 74 are likewise circumferentially spaced about the perimeter of the outer wall 44 and extend from the interior surface 48 to the exterior surface 46 of the outer wall 44 to provide a path for combustible gas to pass therethrough. Each crossover port 74 is located between a pair of adjacent burner ports 62 and is defined by the side walls 64 of its adjacent burner ports 62. Each crossover port 74 is further defined by a floor 76 that extends between the side walls 64 of its adjacent burner ports 62. The floor 76 has a substantially horizontal portion 78 and a ramped portion 80 that are aligned end to end such that the horizontal portion 78 extends radially inward from the exterior surface 46 of the outer wall 44 and the ramped portion 80 extends radially inward from the horizontal portion 78 in a downward direction to the interior surface 48 of the outer wall 44.

The crossover ports 74 each have a height $H_2$, width $W_2$, and area at the exterior surface 46 of the burner body 20 (the height $H_2$ being measured along the central axis X, the width $W_2$ being the distance between the side walls 64 of its adjacent burner ports 62, and the area being the product of the height $H_2$ and width $W_2$). The crossover ports 74 are typically much smaller in height and area than the burner ports 62, and are usually much wider than the burner ports 62. Preferably, the crossover ports 74 each have a height $H_2$ that is greater than or equal to about 0.010 inches and less than or equal to about 0.013 inches, a width $W_2$ that is greater than or equal to about 0.10 inches and less than or equal to about 0.25 inches, and an area that is greater than or equal to about 0.002 square inches and less than or equal to about 0.003 square inches. Furthermore, the ratio of areas of the main burner ports 62 to the crossover ports 74 (i.e., the area of each main burner port 62 divided by the area of each crossover port 74) is preferably greater than or equal to about 3.2 and less than or equal to about 9.5. However, the height $H_2$, width $W_2$, and/or area for each crossover port 74, as well as the ratio of areas for the main burner ports 62 and crossover ports 74, can be any value outside of these ranges without departing from the scope of the invention.

The burner cap 22 is also designed to cover and delimit the top of each crossover port 74. As discussed above and illustrated in FIG. 3, the burner cap 22 has an undersurface 68 with a first surface portion 68a that is configured to rest upon the side walls 64 of the burner ports 62. When so engaged, the first surface portion 68a will cover and delimit the top of each crossover port 74.

The crossover ports 74 provide a small amount of gas between adjacent pairs of burner ports 62 that can be ignited to produce crossover flames. The burner ports 62 and crossover ports 74 thus can collectively produce a substantially continuous ring of flame about the outer wall 44 of the burner body 20. As such, if the flame from one or more of the burner ports 62 is extinguished due to a disturbance from a sudden draft of air, the flame from its adjacent crossover port 74 can reignite it. Moreover, because the area $A_2$ for each crossover port 74 is significantly smaller than the area $A_1$ for each burner port 62, the velocity of gas through the crossover ports 74 will be much greater than, and therefore less susceptible to disturbances compared to, the burner ports 62 even when the overall mass flow rate of combustible gas being delivered to the burner body 20 is low.

In some examples, the burner body 20 can include a stability chamber 82 (seen best in FIG. 2) to help reestablish combustion at the burner ports 62. The stability chamber 82 is defined by a pair of side walls 84 that extend from the inner wall 50 of the burner body 20 to the exterior surface 46 of the outer wall 44. The stability chamber 82 is further defined by a bottom wall 86, a front wall 88, and a rear wall 90. The front wall 88 is located at the exterior surface 46 of the outer wall 44 and joins the outer ends of the side walls 84. Meanwhile, the rear wall 90 is located at the inner wall 50 and joins the inward ends of the side walls 84. The bottom wall 86 joins the bottom portions of the front wall 88, rear wall 90 and side walls 84 and closes off a bottom of the stability chamber 82.

Each of the side walls 84 is arranged substantially transverse to the exterior surface 46 of the outer wall 44 (e.g., radial to the central axis X). In particular, the side walls 84 can be arranged so that the inner ends of the side walls 84 are closer to one another than the outer ends of the side walls 84 such that the stability chamber 82 is wedge-shaped. The side walls 84 each include an upper surface 92 having a first surface portion 92a that extends horizontally inward from the exterior surface 46 of the outer wall 44, a second surface portion 92b that extends vertically downward from an inward end of the first surface portion 92a, a third surface portion 92c that extends horizontally inward from the lower end of the second surface portion 92b, and a fourth surface portion 92d that is angled such that the fourth surface portion 92d extends radially inward from the third surface portion 92c in an upward direction.

The burner cap 22 is designed to cover and delimit the top of the stability chamber 82, so as to substantially preclude the combustible gas from rising out of the combustible gas chamber 60. When the burner cap 22 is installed and resting on the side walls 64 as described above, the first surface portion 68a, third surface portion 68c and fourth surface portion 68d of the burner cap 22 will rest upon the first surface portion 92a, third surface portion 92c, the fourth surface portion 92d, respectively, of the stability chamber's side walls 84. Moreover, the fifth surface portion 68e of the burner cap 22 will rest upon the rear wall 90 of the stability chamber 82 and the second surface portion 68b of the burner cap 22 will face and be located adjacent to the second surface portion 92b of the stability chamber's side walls 84, thereby inhibiting lateral movement of the burner cap 22 relative to the burner body 20.

The stability chamber 82 will be exposed to the ambient atmosphere via an opening 96 at the exterior surface 46 of the outer wall 44. Furthermore, one or more inlets can be provided to permit combustible gas to flow from the combustible-gas chamber 60 into the stability chamber 82. In the present embodiment, two inlets 98 are provided that are at least partially defined by the fourth surface portions 92d of the side walls 84. The burner cap 22 further delimits a top portion of the inlets 98 when the burner cap 22 is placed on the burner body 20. However, in some examples, the inlets 98 may be through-holes that are defined entirely by the side walls 84 or some other portion of the burner body 20 or burner cap 22.

The stability chamber 82 can be located adjacent to one or more of the burner ports 62 or crossover ports 74 such that the stability chamber 82 is exposed to the flame from its adjacent port(s) via the opening 96. The flame from its adjacent port(s) can thus act to ignite any gas received within the stability chamber 82 through the inlet(s) 98. Moreover, once the stability chamber 82 is lit, the stability chamber 82 can act to reestablish combustion at its adjacent ports if their flames are extinguished due to a disturbance in the atmosphere and/or low gas flow.

Preferably, the bottom wall 86 of the stability chamber 82 is located at a level in the burner body 20 that is lower than the level of the burner ports 62 and the combustible-gas chamber 60. In addition, the rear wall 90 of the stability chamber 82 preferably extends to a location above the bottom wall 86 of the stability chamber 82 and below the upper surface 92 side walls 84.

The construction of the stability chamber 82 as described above provides for a chamber in which a relatively large flame can be established even at a relatively low rate of gas flow to the stability chamber 82. Moreover, the flame within the stability chamber 82 will not be as influenced by sudden drafts of air as the burner ports 62 and the crossover ports 74, thereby making the flame within the stability chamber 82 more reliable for reigniting the combustible gas at the burner ports 62 and the crossover ports 74. The functioning of the stability chamber 82 is particularly effective when combustible gas is being delivered to the combustible gas chamber at relatively low rates of flow.

As shown in FIG. 4, the burner body 20 in some examples can include one or more flow restrictions 100 that are configured to regulate flow through a proportion (i.e., fewer than all) of the burner ports 62 to help maintain combustion at the burner ports 62 during low rates of flow. As explained above, the flow of combustible gas being delivered to the burner body 20 is divided among the burner ports 62. Thus, if the total flow of combustible gas being delivered to the burner body 20 is very low and/or the number of burner ports 62 is large (e.g., 20 or more burner ports), the rate of flow passing through each individual burner port 62 may be considerably low, thereby increasing the likelihood of disturbance. As discussed further below, the flow restrictions 100 are configured to restrict flow through a proportion of the burner ports 62 based on a flow rate of combustible gas being supplied to the burner body 20. In particular, when combustible gas is being supplied to the burner body 20 at a low flow rate, the flow restrictions 100 will substantially restrict flow to the proportion of burner ports 62 impeded by the flow restrictions 100, thus directing the combustible gas within the burner body 20 to flow primarily through the unrestricted burner ports 62. Consequently, the restricted ports 62 will produce little to no flame but the unrestricted ports 62 will have a higher flow rate to produce a greater flame that is less susceptible to disturbance. Meanwhile, when combustible gas is being supplied to the burner body 20 at a higher flow rate, the pressure drop across the flow restrictions 100 will be great enough to overcome those restrictions 100 to deliver sufficient combustible gas to the impeded burner ports 62 to support reliable combustion. Thus, at a higher flow rate, combustion gas will elute from all the burner ports 62 with little observable difference in flame quality between impeded and unimpeded burner ports 62.

The flow restrictions 100 in the present embodiment each include a pair of side walls 102 that extend inward from the outer wall 44 of the burner body 20 and a rear wall 104 that connects the inward ends of two side walls 102. Each of the side walls 102 is arranged substantially transversely to the interior surface 48 of the outer wall 44 (e.g., radial to the central axis X) and includes an upper surface 106 having a first horizontal surface portion 106a that extends inward from the outer wall 44, a ramped surface portion 106b that extends inward from the first horizontal surface portion 106a in an upward direction, and a second horizontal surface portion 106c that extends inward from the ramped surface portion 106b. The side walls 102 and rear wall 104 of each flow restriction 100 together with the bottom wall 52 of the burner body 20 define a flow restriction chamber 112.

The flow restrictions 100 are circumferentially spaced about the burner body 20 such that each flow restriction 100 straddles one of the burner ports 62 (though optionally a flow restriction 100 may straddle more than one burner port 62). In particular, the first horizontal surface portion 106a for one side wall 102 can extend from the ramped portion 80 of a crossover port 74 on one side of the associated burner port 62 while the first horizontal surface portion 106a for the other side wall 102 extends from the ramped portion 80 of a crossover port 74 on the other side of the associated burner port 62. Each flow restriction 100 will thus straddle a burner port 62 such that its flow restriction chamber 112 is in direct fluid communication with an inlet of the burner port 62.

The burner cap 22 is designed to cover and delimit the top of the flow restriction chamber 112 for each flow restriction 100 so as to substantially preclude the combustible gas from rising out of the flow restriction chamber 112. When the burner cap 22 is placed on the burner body 20, the third surface portion 68c, fourth surface portion 68d, and fifth surface portion 68e of the burner cap 22 will rest upon the first horizontal surface portion 106a, ramped surface portion 106b, and second horizontal surface portion 106c, respectively, of the flow restriction's side walls 102. Moreover, the fifth surface portion 68e of the burner cap 22 will rest upon the rear wall 104 of the flow restriction 100.

Each flow restriction 100 is provided with at least one inlet 114 that permits fluid communication between its flow restriction chamber 112 and the combustible gas chamber 60 of the burner body 20. In the present embodiment, one inlet 114 is provided for each flow restriction 100, and is defined at least partially by its rear wall 104. The burner cap 22 further delimits the top portion of each inlet 114 when the burner cap 22 is placed on the burner body 20. However, in some examples, one or more inlets 114 for each flow restriction may be through-holes that are defined entirely by its rear wall 104 or some other portion of the flow restriction 100 or burner cap 22.

Each flow restriction 100 is configured such that combustible gas flowing from the combustible-gas chamber 60 to the flow restriction's associated burner port 62 will flow through its inlet 114 and flow restriction chamber 112, and then to the associated burner port 62. Each flow restriction 100 is further configured such that flow through its associated burner port 62 will be restricted according to a restriction ratio that varies based on a flow rate of combustible gas being supplied to the combustible-gas chamber 60 within the burner body 20. (For the purposes of this disclosure, reference to a "restriction ratio" for flow through a restricted burner port means the flow $Q_r$ through the restricted burner port divided by the flow $Q_u$ through an unrestricted burner port (i.e., $Q_r/Q_u$) as combustible gas is being supplied to the combustible gas chamber 60 within the burner body 20. Thus, a "restriction ratio" equal or close to 1 would mean that flow through the restricted and unrestricted ports is substantially equal, whereas a "restriction ratio" equal or close to 0 would mean that flow through the restricted port is equal or close to 0 and/or considerably less than the flow through the unrestricted port).

Figure 5:
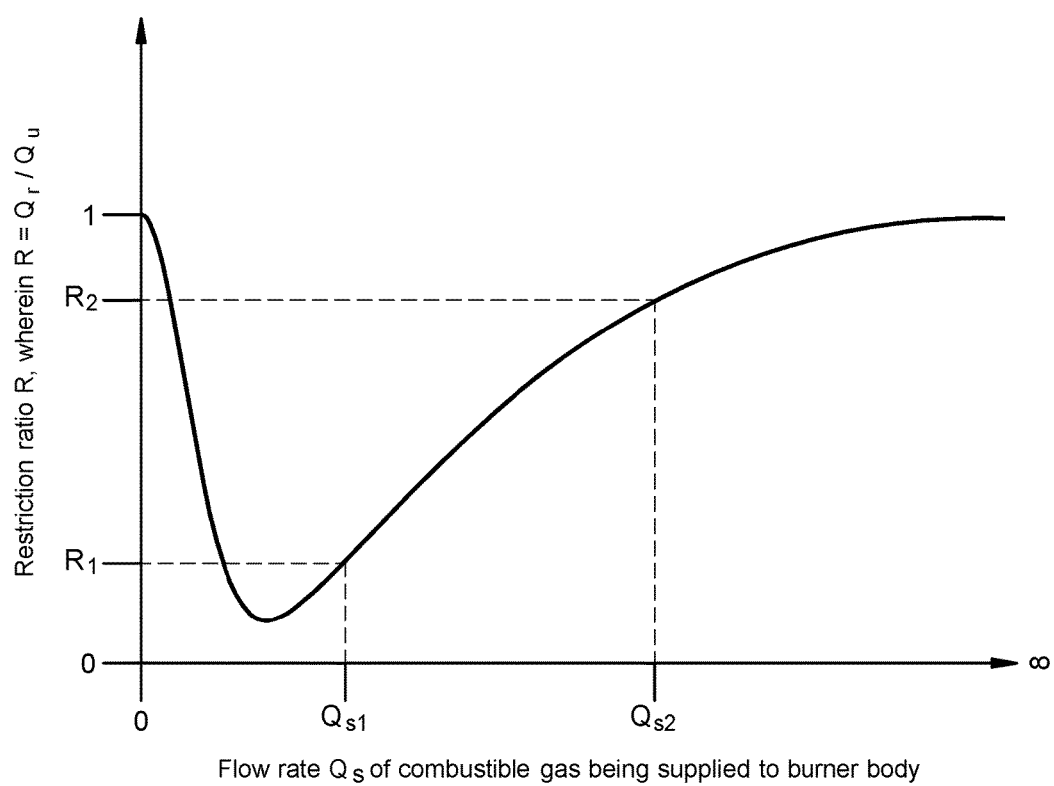
FIG. 5 is a graph that schematically shows an example relationship between a restriction ratio and a flow rate of combustible gas being supplied to the burner assembly.

In particular, each flow restriction 100 is configured such that flow through its associated burner port 62 will be restricted according to a restriction ratio R (wherein $R=Q_r/Q_u$) that, in general, increases as a flow rate $Q_s$ of combustible gas being supplied to the combustible gas chamber 60 increases (and conversely decreases as the flow rate $Q_s$ decreases). For example, as shown in FIG. 5, when combustible gas is supplied to the burner body 20 through its opening 56 at a first flow rate $Q_{s1}$ (e.g., 1100 cfm or less), each flow restriction 100 can be configured to restrict flow through its associated burner port 62 at a first restriction ratio $R_1$ (e.g., 0.60 or lower). Meanwhile, when combustible gas is supplied to the burner body 20 through its opening 56 at a second flow rate $Q_{s2}$ (e.g., 4400 cfm or more) that is greater than the first flow rate $Q_{s1}$, each flow restriction 100 can be configured to restrict flow through its associated burner port 62 at a second restriction ratio $R_2$ (e.g., 0.82 or higher) that is greater than the first restriction ratio $R_1$. Thus, as the flow rate $Q_s$ increases from $Q_{s1}$ to $Q_{s2}$, the restriction ratio R will increase from $R_1$ to $R_2$. Conversely, as the flow rate $Q_s$ decreases from $Q_{s2}$ to $Q_{s1}$, the restriction ratio R will decrease from $R_2$ to $R_1$.

It is to be noted that for extremely low flow rates $Q_s$, the effect of flow rate $Q_s$ on the restriction ratio R may be opposite to that described above, meaning that as the flow rate $Q_s$ decreases and approaches 0, the restriction ratio R may increase and approach 1, as shown in FIG. 5. This is because as the flow rate $Q_s$ decreases to an extremely low value and approaches 0, the resistance to flow of the restricted ports 62 may become so low that it starts to equalize in resistance to the unrestricted ports 62, thereby resulting in a substantially equal flow through the restricted and unrestricted ports 62. However, for most flow rates $Q_s$ commonly used in operation, the restriction ratio R will preferably increase as the flow rate $Q_s$ increases (and decrease as the flow rate $Q_s$ decreases).

In this manner, when combustible gas is supplied to the burner body 20 at relatively high rates, the restriction ratios at the restricted burner ports 62 will be relatively high and combustible gas will flow through all the burner ports 62 at substantially similar rates. However, when combustible gas is supplied to the burner body 20 at relatively low rates, the restriction ratios at the restricted burner ports 62 will be relatively low and thus the flow of combustible gas through the restricted burner ports 62 will be substantially less than the flow of combustible gas through the unrestricted burner ports 62. Consequently, the restricted ports 62 will produce little to no flame but the unrestricted ports 62 will have a higher flow rate to produce a greater flame that is less susceptible to disturbance.

The flow restriction chamber 112 for each flow restriction 100 is preferably configured to act as a stability chamber for its associated burner port 62 in which a relatively large flame can be established within the chamber 112 even at a relatively low rate of gas flow through the flow restriction 100. Moreover, the flame within the chamber 112 will not be as influenced by sudden drafts of air as the exit of its associated burner port 62, thereby making the flame within the chamber 112 less susceptible to disruption and a more reliable source for reigniting its associated burner port 62. Thus, the flow restriction chamber 112 for each flow restriction 100 can help maintain a flame at its associated burner port 62 even when the restriction ratio of at the associated burner port 62 is relatively low and a relatively small flame is being produced at the burner port 62.

To help achieve the effects described above, the inlet 114 for each flow restriction 100 can have a cross-sectional area that is greater than or equal to about 0.0015 square inches and less than or equal to about 0.004 square inches. Furthermore, the flow restriction chamber 112 defined by each flow restriction 100 can have a volume that is greater than or equal to about 0.005 cubic inches and less than or equal to about 0.02 cubic inches. However, the inlet area and chamber volume can be any values outside of these ranges without departing from the scope of the invention.

As discussed above, the flow restrictions 100 in the illustrated embodiment are arranged such that each flow restriction 100 corresponds to one burner port 62 and includes a flow restriction chamber 112 defined by a plurality of walls and an inlet 114 to provide communication between the flow restriction chamber 112 and combustible gas chamber 60. Furthermore, the flow restrictions 100 restrict flow to about half of the burner ports 62. However, it is to be appreciated each flow restriction 100 may correspond to more than one burner port 62 and may comprise any other configuration that serves to restrict flow to its associated burner port(s) 62 as described above. Indeed, in some examples, each flow restriction 100 may simply comprise a protrusion or some other obstruction within the combustible gas chamber 60 that does not define a restriction chamber but nonetheless serves to restrict flow to its associated burner port(s) 62 as described above. Furthermore, it is to be appreciated that the proportion of burner ports 62 restricted by the flow restrictions 100 may comprise any number that is less than all of the burner ports 62. Indeed, in some embodiments, a single flow restriction 100 may be provided that restricts flow to a single burner port 62.

As further discussed above, the burner ports 62, crossover ports 74, stability chamber 82, and flow restrictions 100 are all designed to mate with the undersurface 68 of the burner cap 22. In particular, the undersurface 68 includes surface portions 68a-e that mate with one or more aspects of the burner ports 62, crossover ports 74, stability chamber 82, and flow restrictions 100. Furthermore, because the surface portions 68a-d are annular and the surface portion 68e is circular, the burner cap 22 can be appropriately placed onto the burner body 20 without the necessity of aligning any particular portion of the circumference of the burner cap 22 with the burner ports 62, crossover ports 74, stability chamber 82, and flow restrictions 100. However, it is to be appreciated that surface portions 68a-e of the burner cap 22 and the corresponding mating structure of the burner ports 62, crossover ports 74, stability chamber 82, and flow restrictions 100 may comprise a variety of different configurations that mate with each other. Indeed, in some examples, the undersurface 68 of burner cap 22 may not even mate with one or more of the burner ports 62, crossover ports 74, stability chamber 82, and flow restrictions 100. Furthermore, if the burner cap 22 does mate with any structure of the burner body 20, the mating structure of the burner cap 22 may not be annular in some examples.

The invention has been described with reference to example embodiments described above. Modifications and alterations will occur to others upon a reading and understanding of this specification. Example embodiments incorporating one or more aspects described above are intended to include all such modifications and alterations insofar as they come within the scope of the appended claims.

What is claimed is:

1. A burner body comprising:
   a wall that defines a combustible-gas chamber;
   a gas-flow inlet communicating with the combustible-gas chamber;
   a plurality of burner ports in the wall that permit combustible gas to flow from the combustible-gas chamber through the plurality of burner ports to an exterior of the burner body; and
   one or more flow restrictions configured to restrict flow through a proportion of the plurality of burner ports based on a rate of combustible gas being supplied to the burner body,
   wherein when combustible gas is supplied to said combustible-gas chamber through the gas-flow inlet at a first flow rate, each flow restriction is configured to restrict flow through an associated burner port at a first restriction ratio, and
   wherein when combustible gas is supplied to said combustible-gas chamber through the gas-flow inlet at a second flow rate that is smaller than the first flow rate, each flow restriction is configured to restrict flow through its associated burner port at a second restriction ratio that is less than the first restriction ratio.

2. The burner body according to claim 1, wherein each flow restriction comprises one or more walls that define a flow restriction chamber and at least one inlet that provides fluid communication between the flow restriction chamber and the combustible-gas chamber, further wherein the flow restriction chamber for each flow restriction is in fluid communication with the flow restriction's associated burner port.

3. The burner body according to claim 2, wherein each flow restriction is configured such that combustible gas flowing from the combustible-gas chamber to the flow restriction's associated burner port flows from the combustible-gas chamber, through the at least one inlet and flow restriction chamber of the flow restriction, and then into the flow restriction's associated burner port.

4. The burner body according to claim 2, wherein the one or more walls for each flow restriction comprises a first side wall, a second side wall, and a rear wall that connects the first side wall and second side wall.

5. The burner body according to claim 4, wherein the first side wall and second side wall each comprise an upper surface having a horizontal surface portion and a ramped surface portion.

6. The burner body according to claim 2, wherein the at least one inlet has an inlet area that is greater than or equal to about 0.0015 square inches and less than or equal to about 0.004 square inches.

7. The burner body according to claim 2, the flow restriction chamber has a volume that is greater than or equal to about 0.005 cubic inches and less than or equal to about 0.02 cubic inches.

8. The burner body according to claim 1, further comprising a plurality of crossover ports defined by the wall that permit combustible gas to flow from the combustible-gas chamber through the plurality of crossover ports to an exterior of the burner body, wherein each crossover port is located between a pair of adjacent burner ports.

9. The burner body according to claim 8, wherein each flow restriction comprises a first side wall, a second side wall, and a rear wall that define a flow restriction chamber and at least one inlet that provides fluid communication between the flow restriction chamber and the combustible gas chamber, further wherein the flow restriction chamber for each flow restriction is in fluid communication with the flow restriction's associated burner port.

10. The burner body according to claim 9, wherein the first side wall extends inwardly from a bottom surface of a first crossover port and the second side wall extends inwardly from a bottom surface of a second crossover port.

11. The burner body according to claim 8, wherein each crossover port is smaller in height than each burner port at an exterior surface of the outer wall.

12. The burner body according to claim 8, wherein each crossover port is smaller in area than each burner port at an exterior surface of the outer wall.

13. The burner body according to claim 8, wherein each crossover port is greater in width than each burner port at an exterior surface of the outer wall.

14. A burner assembly comprising:
a burner body comprising:
   a wall that defines a combustible-gas chamber,
   a gas-flow inlet communicating with the combustible-gas chamber,
   a plurality of burner ports in the wall that permit combustible gas to flow from the combustible-gas chamber through the plurality of burner ports to an exterior of the burner body, and
   one or more flow restrictions configured to restrict flow through a proportion of the plurality of burner ports based on a rate of combustible gas being supplied to the burner body; and
a burner cap placed on the burner body that delimits a top of the combustible gas chamber,
wherein when combustible gas is supplied to the burner body through the opening at a first flow rate, each flow restriction is configured to restrict flow through an associated burner port at a first restriction ratio, and
wherein when combustible gas is supplied to the burner body through the opening at a second flow rate that is smaller than the first flow rate, each flow restriction is configured to restrict flow through its associated burner port at a second restriction ratio that is less than the first restriction ratio.

15. The burner assembly according to claim 14, wherein each flow restriction comprises a first side wall, a second side wall, and a rear wall that define a flow restriction chamber and at least one inlet that provides fluid communication between the flow restriction chamber and the combustible-gas chamber, further wherein the flow restriction chamber for each flow restriction is in fluid communication with the flow restriction's associated burner port.

16. The burner assembly according to claim 15, wherein the first side wall and second side wall each comprise an upper surface having a horizontal surface portion and a ramped surface portion that extends inward from the horizontal surface portion in an upward direction.

17. The burner assembly according to claim 16, wherein the burner cap comprises an undersurface having a first surface portion that mates with and engages the horizontal surface portion and a second surface portion that mates with and engages the ramped surface portion.

18. The burner assembly according to claim 17, wherein the first surface portion and the second surface portion of the burner cap are annular.

19. The burner assembly according to claim 17, further comprising a stability chamber defined by a pair of side walls that extend inward from the wall of the burner body and each include a horizontal upper surface portion and a ramped upper surface portion that extends inward from the horizontal upper surface portion in an upwards direction.

20. The burner assembly according to claim 19, wherein:
the first surface portion of the burner cap also mates with and engages the horizontal upper surface portion of each of the pair of side walls, and
second surface portion of the burner cap also mates with and engages the ramped upper surface portion of each of the pair of side walls.

* * * * *